(12) United States Patent
Putman et al.

(10) Patent No.: US 11,846,929 B2
(45) Date of Patent: Dec. 19, 2023

(54) AUTOMATION VISUALIZATION CONTENT DELIVERY VIA CONTAINER ORCHESTRATION SYSTEMS

(71) Applicant: Rockwell Automation Technologies, Inc., Mayfield Heights, OH (US)

(72) Inventors: Nicholas M. Putman, Dexter, MI (US); Matthew B. Hortman, Swanee, GA (US); Randy A. Cannady, Canton, GA (US); Travis J. Seagert, Gainesville, GA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 17/351,446

(22) Filed: Jun. 18, 2021

(65) Prior Publication Data

US 2022/0179398 A1   Jun. 9, 2022

Related U.S. Application Data

(60) Provisional application No. 63/121,611, filed on Dec. 4, 2020.

(51) Int. Cl.
*G05B 19/4155* (2006.01)
*G06F 9/54* (2006.01)

(52) U.S. Cl.
CPC ......... *G05B 19/4155* (2013.01); *G06F 9/547* (2013.01); *G05B 2219/31368* (2013.01)

(58) Field of Classification Search
CPC .......... G05B 19/41835; G05B 19/4155; G05B 2219/31368; G06F 9/45558; G06F 8/60; G06F 9/547; G06F 2009/45575; G06F 2009/4557
See application file for complete search history.

(56) References Cited

U.S. PATENT DOCUMENTS

| 10,404,474 B1 | 9/2019 | Caceres et al. |
| 2010/0325076 A1* | 12/2010 | Paulk ....................... G06N 5/02 |
| | | 707/769 |
| 2016/0274558 A1* | 9/2016 | Strohmenger ......... G05B 15/02 |

(Continued)

OTHER PUBLICATIONS

Extended European Search Report for EP Application No. 21212211.3 dated Apr. 5, 2022, 8 pages.

*Primary Examiner* — Charles E Anya
(74) *Attorney, Agent, or Firm* — Fletcher Yoder, P.C.

(57) ABSTRACT

Systems and method for leveraging container orchestration systems to generate visualizations related to components or operations of an industrial automation system. In particular, a visual manager, a primary node of the container orchestration system, may receive a container image for operating an application of the industrial automation system. A visual manager may identify a container host from a cluster of nodes of the container orchestration system for executing the container in response to the container host meeting container orchestration constraints. Upon execution of the constraint, the container host may transmit configuration details for accessing a visualization associated with the container image to a thin client for display. In some embodiments, the container host, itself, may include a thin client device. Accordingly, the thin client device may execute the container and display the corresponding visualization.

17 Claims, 4 Drawing Sheets

(56) References Cited

U.S. PATENT DOCUMENTS

| | | | |
|---|---|---|---|
| 2017/0090970 A1* | 3/2017 | Baskaran | H04L 47/829 |
| 2018/0075152 A1* | 3/2018 | Zhang | G06F 9/455 |
| 2018/0081664 A1* | 3/2018 | Sagiraju | H04L 41/5054 |
| 2018/0299863 A1* | 10/2018 | Caine | H04L 63/107 |
| 2018/0331969 A1* | 11/2018 | Chen | G06F 9/5083 |
| 2019/0101884 A1 | 4/2019 | Miller et al. | |
| 2019/0102456 A1* | 4/2019 | Miller | G06F 16/168 |
| 2019/0132393 A1* | 5/2019 | Ring | H04L 67/1097 |
| 2020/0027210 A1* | 1/2020 | Haemel | G06F 9/5038 |
| 2020/0032003 A1* | 1/2020 | Ariura | B29C 48/405 |
| 2020/0076685 A1 | 3/2020 | Vaidya et al. | |
| 2020/0174842 A1* | 6/2020 | Wang | H04L 67/63 |
| 2020/0192692 A1* | 6/2020 | Ghag | G06F 9/45558 |
| 2020/0320034 A1* | 10/2020 | Stawikowski | G06F 9/45558 |
| 2021/0096543 A1 | 4/2021 | Stump et al. | |
| 2021/0382727 A1* | 12/2021 | Vigil | G06F 9/5072 |

* cited by examiner

AUTOMATION VISUALIZATION CONTENT DELIVERY VIA CONTAINER ORCHESTRATION SYSTEMS

CROSS REFERENCE TO RELATED APPLICATIONS

This application claims priority from and the benefit of U.S. Provisional Application Ser. No. 63/121,611, entitled "AUTOMATION VISUALIZATION CONTENT DELIVERY VIA CONTAINER ORCHESTRATION SYSTEMS," filed Dec. 4, 2020, which is hereby incorporated by reference in its entirety for all purposes.

BACKGROUND

This disclosure relates generally to container orchestration systems in industrial automation systems. More particularly, embodiments of the present disclosure are related to systems and methods for leveraging container orchestration systems to generate visualizations related to operations of the industrial automation system.

Industrial automation systems are managed and operated using automation control and monitoring systems (e.g., industrial control system), particularly in industrial automation environments. Such applications may include controlling a wide range of components, such as valves, electric motors, and so forth, and the collection of data via sensors. Typical industrial control systems may include one or more components, such as programming terminals, automation controllers, input/output (I/O) modules, communication networks, human-machine interface (HMI) terminals, and the like. Human operators may use some type of interface (e.g., HMI) with which to interact (e.g., monitor, control, analyze, examine) the machine or process of an industrial automation system. However, improvements in such interfaces and interface technologies may be beneficial in providing enhanced functionality, ease of use, data sharing, and so forth within the industrial automation system. Further, improvements in information technology (IT) environment of the industrial automation system may provide industrial control system users additional management tools for operating devices (e.g., interface) as well as may allow for processing capabilities of such operating devices to be better utilized.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a distributed control system may include a processor and a memory, accessible by the processor. The memory may store instructions that, when executed by the processor, cause the processor to run a visualization manager. The distributed control system may be communicatively coupled to a plurality of container hosts of a container orchestration system. The visualization manager may receive, via client input, one or more container images. Each of the one or more container images may include a container image file for operating one or more applications of the distributed control system. The visualization manager may identify a container host of the plurality of container hosts for executing a respective container image of the one or more container images in response to the container host meeting one or more container orchestration constraints. The container host may generate a visualization of a controlled machine or process of the distributed control system in in response to executing the respective container image. Additionally, the visualization manager may transmit, via an API server associated with the visualization manager, a configuration for accessing the visualization associated with the respective container image to a thin client device. The thin client device may display the visualization in response to receiving the configuration for accessing the visualization associated with the respective container image from the container host.

In a further embodiment, a system includes a processor and a memory accessible by the processor. The memory stores instructions that, when executed by the processor, cause the processor to run a visualization manager of a container orchestration system. The visualization manager may receive one or more container images representing one or more containers. The one or more container images may be defined based on client input. The visualization manager may identify a thin client device from a plurality of container hosts of the container orchestration system for executing the one or more containers in response to the thin client device meeting one or more container orchestration constraints. Additionally, the visualization manager may transmit the one or more container images representing the one or more containers to the thin client device. That is, the thin client device may display visualizations related to a machine or a process of an industrial automation system in response to executing the one or more containers.

In an additional embodiment, a thin client device may be a host node in a container orchestration system. The thin client includes a processor and a memory accessible by the processor. The memory stores instructions that, when executed by the processor, cause the processor to perform actions including receiving, via client input, one or more container images from a visualization manager that represents a primary node within the container orchestration system; performing one or more operations related to an industrial automation system specified by the one or more container images; and displaying one or more visualizations corresponding to the one or more operations.

BRIEF DESCRIPTION OF THE DRAWINGS

These and other features, aspects, and advantages of the presently disclosed embodiments will become better understood when the following detailed description is read with reference to the accompanying drawings in which like characters represent like parts throughout the drawings, wherein.

DETAILED DESCRIPTION

Figure 1:
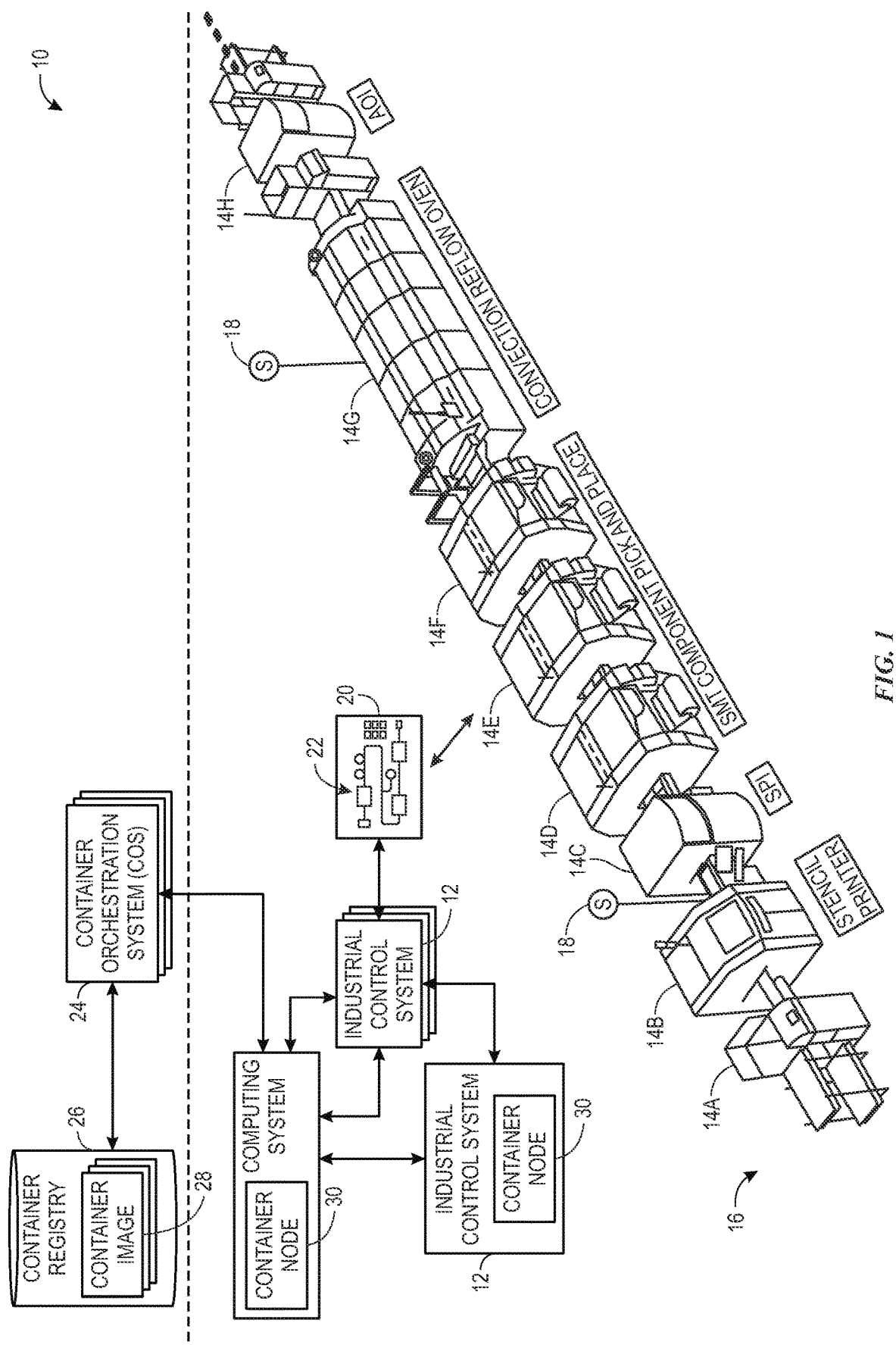
FIG. 1 is a perspective view of an embodiment of an industrial automation system, including an industrial control system, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. As used herein, the terms "container nodes," "host devices," and "container hosts" may be used interchangeably. One or more specific embodiments of the present embodiments described herein will be described below. In an effort to provide a concise description of these embodiments, all features of an actual implementation may not be described in the specification.

Advances in automation systems have enabled coordinated control and monitoring of a wide range of machines and processes. Modern industrial automation is typically based on computer control of motors, valves, and other actuators based upon preset programming, modeling, sensing, and feedback of many different parameters from sensors and monitors, depending upon the machine or process being controlled. Operators interact with the systems in control rooms, but increasingly by local or mobile devices that may be positioned in any convenient location. Remote control and monitoring is also common.

In such applications, human operators may use some type of interface with which to interact (e.g., monitor, control, analyze, examine) the machine or process of an industrial automation system. Often times, such interaction is performed via a human machine interface (HMI). Human machine interfaces may utilize screens that are pre-defined and stored on a monitor-like device. The screens may show diagrams of the controlled machine or process, components, values, process flows, and so forth. In some cases, the screens may allow for a user to interact via touching one or more designated locations on a screen, or through other input devices. Different screens or pages can often be accessed in this way, such as to view different aspects of the machine or process, feedback, process data, performance data, and so forth.

Increasingly, mobile devices and "thin clients" have been used in such settings. The migration to such devices removes some or all of the executable payload from the interface device, but allows for added flexibility, particularly where the interface device is small or mobile. However, even in such environments, the interface devices still simply reproduce views or screens that are served by the originating devices, such as automation controllers, HMI's, cameras, and so forth. As mentioned above, improvements in such interfaces in conjunction with IT technologies to provide enhanced functionality, ease of use, data sharing, and so forth within the industrial automation system may be desirable. As such, visualizations of machines and processes of the industrial automation system may be efficiently displayed by leveraging container orchestration systems.

A visualization management system (e.g., serves as a primary node of the container orchestration system) may allow for useful data in the form of visualizations to be delivered to personnel utilizing, overseeing, controlling, maintaining, or otherwise interacting with the machines and processes. In particular, data comprising visualizations of the systems, parts of the systems, schematic views of the systems, actual images of the systems, data relating to the operation of the system (both in real or near-real time and historically) may be provided that include visualizations acquired from multiple different sources. That is, visualization content may be provided to multiple different users, such as via one or more fixed-location HMIs, by mobile or hand-held devices, or the like. These devices may be hard-mounted on or near the controlled or monitored equipment, or may be generally retained in a location (e.g., via a tether). In some embodiments, thin-client HMIs may receive the visualization content via any suitable wireless technology, or via wired connections (e.g., network cabling and protocols). Thin client devices may themselves be computer terminals, screens, monitors, tablet devices, smartphones, laptops, or any other device capable of receiving and displaying the visualization content.

As used herein the term "thin client" is intended to convey that the visualization-generating applications or executable code may not be executed by or instantiated on the thin client device itself (though the device may be capable of such functionality, computation, online operation, browser searching and display, telephonic or video calling, etc.). Instead, the thin client devices receive data defining an image or screen (i.e., visualizations) that is simply interpreted and displayed by the devices. In some embodiments, the thin client devices may receive a configuration for accessing a visualization (e.g., connection details for viewing the visualization or an output generated by a container of a container orchestration system). Advantageously, the devices may interact with the visualizations, such as by touching locations on a touchscreen of the devices, keyed inputs, voice commands, and so forth. In the automation context, such devices may be referred to as human machine interfaces ("HMIs"), or "thin client HMIs." As discussed below, the thin clients may perform useful tasks such as triggering visualization delivery based on certain events, authenticating and re-authenticating users, sharing of all or part of visualizations with others, and monitoring reduced-dataset visualizations where desirable, as defined by the configurations provided by a further component (that is, the visualization manager discussed below).

In some embodiments, the visualization management system may include visualization technology that enables users to view multiple views and screens combined in a single presentation or interface that can be created, viewed, interacted with, and altered in automated and manual ways. The visualization management system may be incorporated for the control and/or monitoring of any machine or process system, which itself may comprise multiple machines or processes. In many applications, these machines or processes may be controlled by dedicated control devices, such as one or more automation controllers. These one or more automation controllers may be located at, in or on the controlled and/or monitored system (e.g., mounted on the equipment or in close proximity to it, on a factory or facility floor, etc.), or in some cases may be at least partially remote from the equipment (e.g., in control rooms, etc.). In some embodiments, such monitoring and control components may be coupled to one or more machines (and other equipment) via networks.

As mentioned above, container orchestration systems may be used in IT systems of industrial automation system such that visualization of industrial components and machines are efficiently delivered to personnel of the industrial automation system. That is, the IT systems may leverage software containers (e.g., operating system level virtualization) in conjunction with container orchestration systems (e.g., Docker, Kubernetes) to coordinate the construction and deployment of various containers across a number of computing resources. Indeed, containers may include standard units of software that packages code and its dependencies, such that a container node may execute the application stored in the container regardless of the computing environment or infrastructure. As a result, multiple containers can run on the same machine and share an operating system kernel with other containers, such that each container is running as an isolated process in the respective machine. In this way, container orchestration systems that operate in the IT environment build application services operate across multiple computing resources, such that certain applications (e.g., packaged as software containers) may be automatically deployed, scaled, and managed in the same machine or across multiple machines in disparate computing environments. The visual manager system may be integrated with the container orchestration system such that the visual manager system represents a primary node that manages a cluster of container nodes or hosts of the container orchestration system. With this in mind, using container orchestration systems may realize many advantages including large scale application deployment to deliver visualizations, providing updates from managed registries, providing high availability using standby and backup container replicas, and the like.

By way of introduction, FIG. 1 is a perspective view of an example industrial automation system 10 controlled by one or more industrial control systems 12. The industrial automation system 10 includes stations 14 having machine components and/or machines to conduct functions within an automated process, such as silicon wafer manufacturing, as is depicted. The automated process may begin at a station 14A used for loading objects, such as substrates, into the industrial automation system 10 via a conveyor section 16. The conveyor section 16 may transport the objects to a station 14B to perform a first action, such a printing solder paste to the substrate via stenciling. As objects exit from the station 14B, the conveyor section 16 may transport the objects to a station 14C for solder paste inspection (SPI) to inspect printer results, to a station 14D, 14E, and 14F for surface mount technology (SMT) component placement, to a station 14G for convection reflow oven to melt the solder to make electrical couplings, and finally to a station 14H for automated optical inspection (AOI) to inspect the object manufactured (e.g., the manufactured printed circuit board). After the objects proceed through the various stations, the objects may be removed from the station 14H, for example, for storage in a warehouse or for shipment. It should be understood, however, that for other applications, the particular system, machine components, machines, stations, and/or conveyors may be different or specially adapted to the application.

For example, the industrial automation system 10 may include machinery to perform various operations in a compressor station, an oil refinery, a batch operation for making food items, chemical processing operations, brewery operations, mining operations, a mechanized assembly line, and so forth. Accordingly, the industrial automation system 10 may include a variety of operational components, such as electric motors, valves, actuators, temperature elements, pressure sensors, or a myriad of machinery or devices used for manufacturing, processing, material handling, and other applications. The industrial automation system 10 may also include electrical equipment, hydraulic equipment, compressed air equipment, steam equipment, mechanical tools, protective equipment, refrigeration equipment, power lines, hydraulic lines, steam lines, and the like. Some example types of equipment may include mixers, machine conveyors, tanks, skids, specialized original equipment manufacturer machines, and the like. In addition to the equipment described above, the industrial automation system 10 may also include motors, protection devices, switchgear, compressors, and the like.

In certain embodiments, one or more properties of the industrial automation system 10 equipment, such as the stations 14, may be monitored and controlled by the industrial control systems 12 for regulating control variables. For example, sensing devices (e.g., sensors 18) may monitor various properties of the industrial automation system 10 and may be used by the industrial control systems 12 at least in part in adjusting operations of the industrial automation system 10 (e.g., as part of a control loop). In some cases, the industrial automation system 10 may be associated with devices used by other equipment. For instance, scanners, gauges, valves, flow meters, and the like may be disposed on or within the industrial automation system 10. Here, the industrial control systems 12 may receive data from the associated devices and use the data to perform their respective operations more efficiently. For example, a controller of the industrial automation system 10 associated with a motor drive may receive data regarding a temperature of a connected motor and may adjust operations of the motor drive based on the data.

The industrial control systems 12 may be communicatively coupled to a display/operator interface 20 (e.g., a human-machine interface (HMI)) and to devices of the industrial automation system 10. It should be understood that any suitable number of industrial control systems 12 may be used in a particular industrial automation system 10 embodiment. The industrial control systems 12 may facilitate representing components of the industrial automation system 10 through programming objects that may be instantiated and executed to provide simulated functionality similar or identical to the actual components, as well as visualization of the components, or both, on the display/operator interface 20. The programming objects may include code and/or instructions stored in the industrial control systems 12 and executed by processing circuitry of the industrial control systems 12. The processing circuitry may communicate with memory circuitry to permit the storage of the component visualizations.

As illustrated, a display/operator interface 20 depicts representations 22 of the components of the industrial automation system 10. The industrial control system 12 may use data transmitted by sensors 18 to update visualizations of the components via changing one or more statuses, states, and/or indications of current operations of the components. These sensors 18 may be any suitable device adapted to provide information regarding process conditions. Indeed, the sensors 18 may be used in a process loop (e.g., control loop) that may be monitored and controlled by the industrial control system 12. As such, a process loop may be activated based on process inputs (e.g., an input from the sensor 18) or direct input from a person via the display/operator interface 20. The person operating and/or monitoring the industrial automation system 10 may reference the display/operator interface 20 to determine various statuses, states, and/or current operations of the industrial automation system 10 and/or for a particular component. Furthermore, the person operating and/or monitoring the industrial automation system 10 may adjust to various components to start, stop, power-down, power-on, or otherwise adjust an operation of one or more components of the industrial automation system 10 through interactions with control panels or various input devices.

An information technology (IT) environment for operating one of components of the industrial automation system 10 may include a container orchestration system 24. The container orchestration system 24 may include a cluster of multiple computing devices that coordinates an automatic process of managing or scheduling work of individual containers for applications within the computing devices of the cluster. In other words, the container orchestration system 24 may be used to automate various tasks at scale across multiple computing devices. By way of example, the container orchestration system 24 may automate tasks such as configuring and scheduling of containers, provisioning and deployments of containers, determining availability of containers, configuring applications in terms of the containers that they run in, scaling of containers to equally balance application workloads across an infrastructure, allocating resources between containers, performing load balancing, traffic routing and service discovery of containers, performing health monitoring of containers, securing the interactions between containers, and the like. In any case, the container orchestration system 24 may use configuration files to determine a network protocol to facilitate communication between containers, a storage location to save logs, and the like. The container orchestration system 24 may also schedule deployment of containers into clusters and identify a host (e.g., node) that may be best suited for executing the container. After the host is identified, the container orchestration system 24 may manage the lifecycle of the container based on predetermined specifications.

With the foregoing in mind, it should be noted that containers refer to technology for packaging an application along with its runtime dependencies. That is, containers include applications that are decoupled from an underlying host infrastructure (e.g., operating system). By including the run time dependencies with the container, the container may perform in the same manner regardless of the host in which it is operating. In some embodiments, containers may be stored in a container registry 26 as container images 28. The container registry 26 may be any suitable data storage or database that may be accessible to the container orchestration system 24. The container image 28 may correspond to an executable software package that includes the tools and data employed to execute a respective application. That is, the container image 28 may include related code for operating the application, application libraries, system libraries, runtime tools, default values for various settings, and the like.

By way of example, an integrated development environment (IDE) tool may be employed by a user to create a deployment configuration file that specifies a desired state for the collection of nodes of the container orchestration system 24. The deployment configuration file may be stored in the container registry 26 along with the respective container images 28 associated with the deployment configuration file. The deployment configuration file may include a list of different pods and a number of replicas for each pod that should be operating within the container orchestration system 24 at any given time. Each pod may correspond to a logical unit of an application, which may be associated with one or more containers. The container orchestration system 24 may coordinate the distribution and execution of the pods listed in the deployment configuration file, such that the desired state is continuously met. In some embodiments, the container orchestration system 24 may include a primary node that retrieves the deployment configuration files from the container registry 26, schedules the deployment of pods to the connected nodes, and ensures that the desired state specified in the deployment configuration file is met. For instance, if a pod stops operating on one node, the primary node may receive a notification from the respective worker node that is no longer executing the pod and deploy the pod to another worker node to ensure that the desired state is present across the cluster of nodes.

As mentioned above, the container orchestration system 24 may include a cluster of computing devices, computing systems, or container nodes that may work together to achieve certain specifications or states, as designated in the respective container. In some embodiments, container nodes 30 may be integrated within industrial control systems 12 as shown in FIG. 1. That is, container nodes 30 may be implemented by the industrial control systems 12, such that they appear as worker nodes to the primary node in the container orchestration system 24. In this way, the primary node of the container orchestration system 24 may send commands to the container nodes 30 that are also configured to perform applications and operations for the respective industrial equipment.

With this in mind, the container nodes 30 may be integrated with the industrial control systems 12, such that they serve as passive-indirect participants, passive-direct participants, or active participants of the container orchestration system 24. As passive-indirect participants, the container nodes 30 may respond to a subset of all of the commands that may be issued by the container orchestration system 24. In this way, the container nodes 30 may support limited container lifecycle features, such as receiving pods, executing the pods, updating a respective filesystem to included software packages for execution by the industrial control system 12, and reporting the status of the pods to the primary node of the container orchestration system 24. The limited features implementable by the container nodes 30 that operate in the passive-indirect mode may be limited to commands that the respective industrial control system 12 may implement using native commands that map directly to the commands received by the primary node of the container orchestration system 24. Moreover, the container node 30 operating in the passive-indirect mode of operation may not be capable to push the packages or directly control the operation of the industrial control system 12 to execute the package. Instead, the industrial control system 12 may periodically check the file system of the container node 30 and retrieve the new package at that time for execution.

As passive-direct participants, the container nodes 30 may operate as a node that is part of the cluster of nodes for the container orchestration system 24. As such, the container node 30 may support the full container lifecycle features. That is, container node 30 operating in the passive-direct mode may unpack a container image and push the resultant package to the industrial control system 12, such that the industrial control system 12 executes the package in response to receiving it from the container node 30. As such, the container orchestration system 24 may have access to a worker node that may directly implement commands received from the primary node onto the industrial control system 12. In the active participant mode, the container node 30 may include a computing module or system that hosts an operating system (e.g., Linux) that may continuously operate a container host that may participate in the management of container operations. As such, the active participant container node 30 may perform any operations that the primary node of the container orchestration system 24 may perform.

Figure 2:
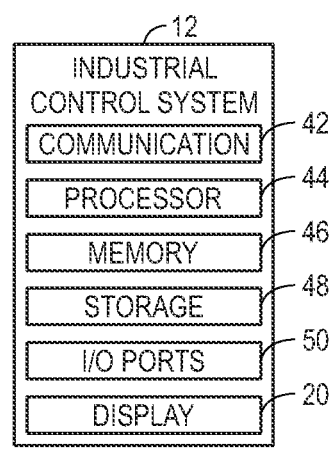
FIG. 2 is a block diagram of an embodiment of the industrial control system shown in FIG. 1, in accordance with an embodiment.

With the foregoing in mind, FIG. 2 is a block diagram of an example industrial control system 12 that may be used with the embodiments described herein. The industrial control system 12 may include a communication component 42, a processor 44, a memory 46, a storage component 48, input/output (I/O) ports 50, a display 20, and the like. The communication component 42 may be a wireless or wired communication component that facilitates communication between the container orchestration system 24 and the industrial control system 12, or any other suitable electronic device. The processor 44 may be any type of computer processor or microprocessor capable of executing computer-executable code. The processor 44 may also include multiple processors that may perform the operations described below.

The memory 46 and the storage 48 may be any suitable article of manufacture that may serve as media to store processor-executable code, data, or the like. These articles of manufacture may represent computer-readable media (i.e., any suitable form of memory or storage) that may store the processor-executable code used by the processor 44 to perform the presently disclosed techniques. The memory 46 and the storage 48 may represent non-transitory computer-readable media (e.g., any suitable form of memory or storage) that may store the processor-executable code used by the processor 44 to perform various techniques described herein. It should be noted that non-transitory merely indicates that the media is tangible and not a signal. The I/O ports 50 may couple to one or more sensors 18, one or more input devices, one or more displays, or the like to facilitate human or machine interaction with the industrial control system 12.

The display 20, as discussed above, may operate to depict visualizations associated with software or executable code being processed by the processor 44. In one embodiment, the display 20 may be a touch display capable of receiving inputs from a user of the industrial control system 12. The display 20 may be any suitable type of display, such as a liquid crystal display (LCD), plasma display, or an organic light emitting diode (OLED) display, for example. Additionally, in one embodiment, the display 20 may be provided in conjunction with a touch-sensitive mechanism (e.g., a touch screen) that may function as part of a control interface for the industrial control system 12.

Although FIG. 2 is depicted with respect to the industrial control system 12, it should be noted that the container orchestration system 24 and the container nodes 30 shown and described with regard to FIG. 1 may also include the same or similar components to perform, or facilitate performing, the various techniques described herein. Moreover, it should be understood that the components described with respect to FIG. 2 are exemplary figures and the industrial control system 12 and other suitable computing systems may include additional or fewer components as detailed above.

Figure 3:
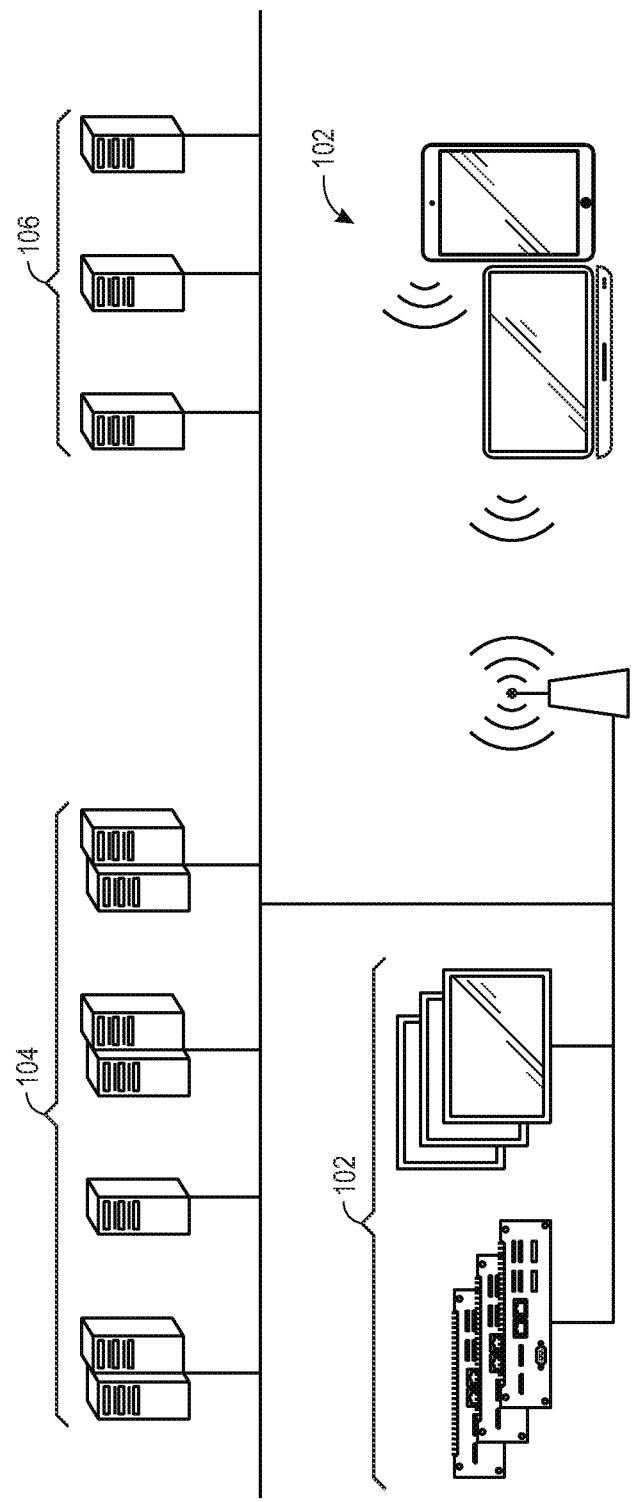
FIG. 3 is a schematic illustrating the deployment of a container orchestration, including container pods, to the industrial control systems of FIG. 2, in accordance with an embodiment.

By way of example, FIG. 3 illustrates an example of a visualization manager system 104 that is a part of a container orchestration system 106. The visualization manager system 104 may include one or more servers or other processing components capable of accessing or permitting access to data defining visualization content from multiple other components that themselves produce the content. The visualization manager system 104 is coupled to or includes interface circuitry for transmitting data between the visualization manager system 104 and thin clients 102 for authentication and for permitting access to visualizations on the thin clients 102, such as based on policies defined by one or more operators and stored on the visualization manager system 104. As discussed below, in operation, the visualization manager system 104 receives data indicative of such factors as identifications of the thin clients 102, their locations, their users or the user roles, event triggers, and so forth, and based upon permission policies incorporating such information, permits access by the thin clients 102 directly to visualizations generated by one or more other components, which may be referred to as industrial automation visualization sources.

The policies may be developed and configured, along with definition and configurations of the visualizations via a configuration terminal/system. Software, firmware or a combination thereof may be executed on the configuration terminal to select the particular visualizations desired, the users, the user roles, the locations, the devices, and any other relevant factors or data that will form the basis for acquiring the desired visualizations from source devices, compiling or defining any derivative visualizations (e.g., nameplate visualizations based on templates), and displaying the visualizations on the devices in accordance with the relevant factors. The collection of rules established in this way are the "policies" implemented by the visualization manager system 104.

In operation, the visualization manager system 104 itself does not typically execute or instantiate applications that produce the visualization content that is accessed and displayed, but based on the policies, refers to configuration data to permit the thin clients 102 to access such content from other devices where the applications are running. In some cases, the visualization manager system 104 may compile visualizations from data from the data sources and deliver them to the thin clients 102. The sources may include, for example, automation controllers, and other computers controlling and/or monitoring the machines or processes, computers on which models, schematics, documentation, historical data, or any other useful visualization content are stored or created. The configurations for regulating access by the thin clients by the visualization manager system 104 may also cause the thin clients 102 to access camera inputs in the form of streaming image data that can be incorporated into one or more visualizations. The ability to store and provide configurations for receiving and accessing these visualizations allows the visualization manager system 104 to play a role that is provided by none of the contributing visualization data sources, and in a manner that reduces or eliminates the need for a programmer or user to separately access or separately display the individual visualizations (e.g., reducing the need to page or flip through different screens providing different information).

As mentioned above, applications generating the visualizations do not themselves need to be executed on the thin clients 102. Rather, the thin clients 102 merely receive and display the visualizations, and may permit interactions, such as to access other sites or remote information, command certain permitted functions to be performed by the source where the applications are running, and so forth. In some embodiments, the thin client devices may receive a configuration for accessing or retrieving the visualizations (e.g., connection details for viewing the visualization associated with a particular container image from a container). In the industrial automation context, these functions may include some or all permitted control operations that can be done by the source, such as in the case of an automation controller or motor drive.

In some cases, processing operations for generating the visualizations is performed via the remote desktop services. As such, a remote desktop session may be active and the remote desktop session may be delivered to the thin clients 102, which may be operating using the operating system of the remote desktop session. By operating using the operating system (e.g., MICROSOFT WINDOWS, APPLE MAC OSX, LINUX, ANDROID, APPLE IOS, etc.) of the remote desktop services, the thin clients 102 may use a specific operating system session, a particular operating system user, certain operating system permissions for the user, and the like. That is, the remote desktop services concurrently execute and maintain different processes for facilitating the visualization operations via the thin clients 102, thereby reducing the processing efficiency of the visualization management system 104.

Compared to remote desktop services, to better utilize the available processing capabilities and power of the visualization management system 104 (e.g., including thin client 102), the present embodiments include employing a container orchestration system 106 (e.g., Docker Engine) to run containers that provide the visual content for the thin clients 102. That is, processing operations for generating the visual content or visualizations may be performed via a container orchestration system 106. By way of example, the container orchestration system 106 may include a cluster of container nodes that may work together to achieve certain specifications or states, as designated in a particular container.

In some embodiments, the visualization management system 104 may determine a suitable container node from the cluster of nodes to execute the particular container. As discussed below, the visualization management system 104 may identify a suitable container node for executing the particular container based on the container node meeting container orchestration constraints. Non-limiting examples of the container nodes may include servers, remote desktops, and other computing devices. The visual management system 104 may transmit the particular container to the suitable container node for performing an application or operation specified by the particular container. For example, the application or operation specified by the particular container may include generating visual content or visualizations related to a controlled machine or process of an industrial automation system. In response to generating visual content or visualizations based on the particular container, configuration details for accessing the visual content or visualizations may be transmitted to a thin client device for display via an applications programming interface (API) server associated with the visual management system 104. Accordingly, the thin client device may display the visual content or visualizations received from the particular container node.

In additional and/or alternative embodiments, container nodes may be running on thin client devices 102 or container nodes may include thin client devices 102. Rather than operating via a local operating system and having processing capabilities, the thin client devices 102 may serve as container nodes for executing containers and displaying visual content from the executed containers. It can be appreciated that the thin client devices 102 are energy efficient, easier to maintain, and cost efficient compared to hosts that rely on local operating systems and processing capabilities.

In some embodiments, in addition to the thin client devices 102, a ThinManager application (e.g., visualization manager of the visualization management system 104) may serve a primary node or a part of the container orchestration system. The ThinManager application may be in communication with instances of other container nodes or container hosts (e.g., operating Docker Engine or other container host software) running on the local machine and/or other servers and/or thin client devices 102. In this way, ThinManager application of the container orchestration system may send commands to the thin client devices 102 that are also configured to run applications and perform operations for the respective equipment.

By way of example, container orchestration systems may be used in systems to manage operations (e.g., displayed visualizations) in the thin client devices 102. That is, thin client devices 102 may leverage software containers (e.g., operating system level virtualization) in conjunction with container orchestration systems (e.g., Docker, Kubernetes, etc.) to coordinate the construction and deployment of various containers across a number of computing resources including the thin client devices 102. Containers may include standard units of software that packages code and its dependencies, such that a container node may execute the application stored in the container regardless of the computing environment or infrastructure. As a result, multiple containers can run on the same machine and share an operating system kernel with other containers, such that each container is running as an isolated process in the respective machine. In this way, container orchestration systems build application services that may operate across multiple computing resources, such that certain applications (e.g., packaged as software containers) may be automatically deployed, scaled, and managed in the same machine or across multiple machines in disparate computing environments.

The container orchestration system 106 may run on any suitable computing environment with different operating systems (e.g., Linux server, terminal (zero client), windows server). The container orchestration system 106, such as the ThinManager application, may direct a host node of the container orchestration system to initiate or instantiate a container and connect to it. The ThinManager application may then push out a container image to the thin client devices 102, such that the thin client devices 102 may operate or perform the operations specified in the container. In some embodiments, the ThinManager application may specify where a container will run based on processing availability of various components. In this way, the ThinManager application may load balance where containers are run.

By way of operation, when the thin client devices 102 initiate or boot the ThinManager application (e.g., operating via a node of the container orchestration system 106) the ThinManager application may deliver firmware, which can contain a container platform that can host the container (e.g., can be local or remote). That is, an operating system kernel (e.g., Linux kernel) may be delivered via the ThinManager application to the thin client devices 102. Additionally, the ThinManager application may deliver an appropriate container to the thin client devices 102 to take advantage of the processing abilities of the thin client devices 102.

In some embodiments, a virtual machine may be operating via an operating system being executed by the container host to execute the container. For example, if the container host operates using Windows, a Linux container on Windows (LCOW) may be executed using a lightweight virtual machine running in the background. In another embodiment, if the thin client devices 102 operate using Linux, the thin client devices 102 or the ThinManager application may operate as an independent thread.

In additional and/or additional embodiments, the ThinManager application (e.g., visualization manager of the visualization management system 104) may serve as a primary node or the container orchestration system 106. For example, the ThinManager application may be any suitable computing device (e.g., network computer, server computer) with computing power (e.g., central processing unit (CPU), random access memory (RAM)) that is greater than the computing power of container hosts (e.g., host devices) of the container orchestration system 106. In some embodiments, the container hosts may include thin client devices that execute containers of the container orchestration system 106. For example, the ThinManager application may identify particular thin client devices to serve as container hosts for executing the containers. In response to executing the containers, the thin client devices serving as container hosts may generate visualizations related to industrial control system 12. The ThinManager application may access the visualizations and determine devices that are not part of the container orchestration system 106 for displaying the visualizations. For example, such devices that are not a part of the container orchestration system 106 may also include thin client devices, which are separate from the thin client devices that serve as container hosts of the container orchestration system 106. Thin client devices that are not a part of the container orchestration system 106 may not have the resource capacity and/or processing power to execute the containers of the container orchestration system 106. As such, thin client devices that are not a part of the container orchestration system 106 may be smaller in terms of size and processing power compared to the thin client devices serving as container hosts. After receiving visualizations generated by the thin client devices serving as container hosts from the ThinManager application, the thin client devices that are not a part of the container orchestration system 106 may display the visualizations.

Figure 4:
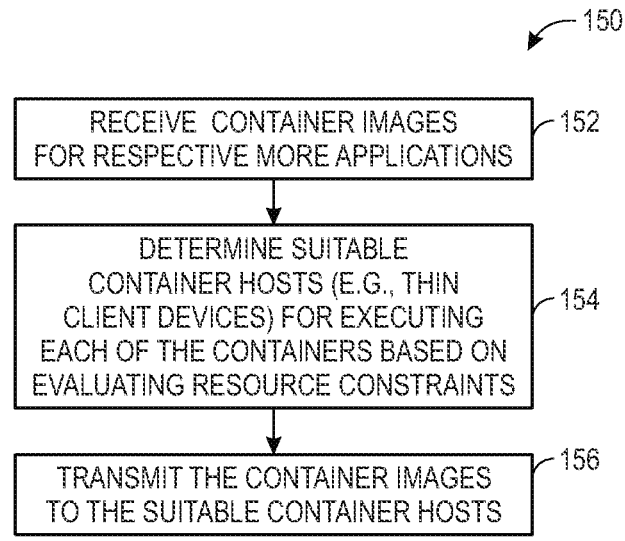
FIG. 4 is a flow diagram illustrating the visualization manager system scheduling a container with a thin client of the container orchestration system of FIG. 3, in accordance with an embodiment.

Keeping the foregoing in mind, FIG. 4 illustrates a flow chart for a process 150 by which a primary container node (e.g., visualization manager, ThinManager application) manages and schedules a container of the container orchestration system. Although the following description of the process 150 is described as being performed by the visualization manager, it should be understood that any suitable primary container node that is configured to interface with a cluster of nodes of the container orchestration system and the industrial control system may perform the operations described herein. In addition, although the process 150 is described in a particular order, it should be understood that the steps of the process 150 may be performed in any suitable order. Further, some embodiments of the process 150, one or more steps may be omitted and/or one or more additional steps may be added.

Referring now to FIG. 4, at block 152, the visualization manager (e.g., primary container node, ThinManager application) may receive one or more container images defined by personnel of an industrial automation system. As mentioned above, the container images may comprise configuration files for executing respective applications (e.g., SAP, Excel, etc.) as containers via container hosts of the container orchestration system. The configuration files may include source code, application libraries, system libraries, dependencies, runtime tools, default values for application settings, and the like for applications. These applications related to components of the industrial automation system may be stored as container images but operate as containers at runtime of the container hosts.

At 154, the visualization manager may determine which container host (e.g., container node) of the container orchestration system is suitable for executing the container images. In particular, the visualization manager may include an applications programming interface (API) for the container orchestration system, a scheduler component, core resources controllers, and the like. By way of example, the visualization manager may coordinate interactions between containers hosts (e.g., nodes of the cluster) that make up the container orchestration system 24. The visualization manager may be responsible for deciding the operations that will run on container hosts including scheduling workloads (e.g., containerized applications), managing the workloads' lifecycle, scaling, and upgrades, managing network and storage resources for the workloads, and the like. The visualization manager may run an API server to handle requests and status updates received from the container hosts.

The visualization manager may identify a container host that may fit container orchestration constraints or specifications provided in the one or more configuration files. The container orchestration constraints may be related to resource availability, memory availability, central processing unit (CPU) availability of components of the industrial automation system and corresponding container hosts of the container orchestration system. Additionally, the container orchestration constrains may be based on equally balancing application workloads across an infrastructure of the industrial automation system. The constraint specifications may be input or modified by personnel of the industrial automation system. That is, the visualization manager, via a scheduler, performs scheduling operations that involve checking the state data for each container host of the container orchestration system, determining whether a suitable node exists for the constraints provided in one or more configuration files, and the like.

In some embodiments, the scheduler components of the visualization manager may evaluate each of the container hosts with respect to container orchestration constraints and rank each of the container hosts. For example, the visualization manager may check whether each of the container hosts have available resources to meet resource requests for running a particular container. Based on the container hosts that have a suitable amount of available resources to meet resources requests of the particular container, the visual manager may rank each of the container hosts based on the container orchestration constraints. The visualization manager may identify a particular container host as suitable for executing the particular container based on the particular container host having a higher ranking compared to other container hosts of the container orchestration system. In some embodiments, if more than one container hosts have similar ranking with respect to the container orchestration constraints, then the visual manager may identify a container host as suitable for executing the particular container at random or based on other predetermined factors. In some embodiments, a suitable container host may be running on a thin client device. After identifying the suitable container host, at block 156, the visual manager, via an API server, may schedule deployment of the particular container to the suitable container host (e.g., thin client device).

Figure 5:
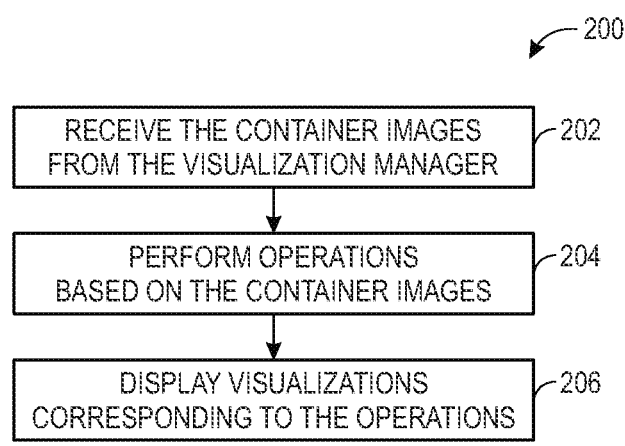
FIG. 5 is a flow diagram illustrating the thin client device of FIG. 4 displaying visualizations based on executing the container, in accordance with an embodiment.

FIG. 5 illustrates a flow chart of a process 200, by which a thin client device displays visualizations in response to executing containers received from a visualization manager of a container orchestration system. Although the following description of the process 200 is described as being performed by the thin client device, it should be understood that any suitable container host that is configured to interface with the visualization manager (e.g., primary container node) of the container orchestration system and the industrial control system may perform the operations described herein. In addition, although the steps of the process 200 are described in a particular order, it should be understood that the steps of the process 200 may be performed in any suitable order. Further, some embodiments of the process 200, one or more steps may be omitted and/or one or more additional steps may be added.

At block 202, the thin client device received the containers transmitted by the visualization manager, as described with regard to FIG. 4. At block 204, the thin client device executes the containers and/or performs operations specified by the containers. Some types of host devices of the container orchestration system may use local processing power to execute respective containers. Other types of host devices such as the thin client device may use its available computational memory to execute the containers. Even without a local operating system, it should be appreciated that the thin client device can manage applications and deliver visualizations corresponding to the containers received. As such, at block 206, the thin client device displays visualizations corresponding to the operations specified by the transmitted containers. The visualizations may include real or near-real time views of machines or processes, schematics, documentation, virtual instrumentation, camera views, augmented reality views or any other useful visual representations related to the industrial automation system.

While only certain features of the disclosure have been illustrated and described herein, many modifications and changes will occur to those skilled in the art. It is, therefore, to be understood that the appended claims are intended to cover all such modifications and changes as fall within the true spirit of the present disclosure. The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or"step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A distributed control system, comprising:
a processor; and
a memory, accessible by the processor, and storing instructions that, when executed by the processor, cause the processor to run a visualization manager, wherein the distributed control system is communicatively coupled to a plurality of container hosts of a container orchestration system, and wherein the visualization manager is configured to perform actions comprising:
receiving, via client input, one or more container images, wherein each of the one or more container images comprises a container image file for operating one or more applications of the distributed control system;
identifying a container host of the plurality of container hosts for executing a respective container image of the one or more container images in response to the container host meeting one or more container orchestration constraints, wherein the one or more container orchestration constraints are indicative of an amount of resources available to meet a resource request for running a container, wherein the container host is configured to generate a visualization of a controlled machine or process of the distributed control system in response to executing the respective container image; and
transmitting, via an API server associated with the visualization manager, a configuration for accessing the visualization associated with the respective container image to a thin client device, wherein the thin client device is configured to display the visualization in response to receiving the configuration for accessing the visualization associated with the respective container image from the container host.

2. The distributed control system of claim 1, wherein the plurality of container hosts comprises servers, remote desktops, computing devices, thin clients, or any combination thereof.

3. The distributed control system of claim 1, wherein the container image file comprises source code, one or more application libraries, one or more system libraries, one or more dependencies, one or more runtime tools, one or more default values for application settings, or any combination thereof, associated with the one or more applications.

4. The distributed control system of claim 1, wherein the thin client device is configured to display the visualization using available memory of the thin client device.

5. The distributed control system of claim 1, wherein the one or more container orchestration constraints comprise resource availability, memory availability, central processing unit (CPU) availability, or any combination thereof associated with each of the plurality of container hosts.

6. The distributed control system of claim 1, wherein the actions comprise:
ranking each of the plurality of container hosts based on the one or more container orchestration constraints; and
identifying the container host from the plurality of container hosts for executing the respective container image based on determining the container host has a higher ranking compared to other container hosts of the plurality of container hosts.

7. The distributed control system of claim 1, wherein the visualization comprises an enhanced camera view, an augmented reality view, or both of at least a portion of the controlled machine or process of the distributed control system.

8. The distributed control system of claim 1, wherein the thin client device comprises a computer terminal, a screen, a monitor, a tablet device, a smartphone, laptop, or any combination thereof.

9. The distributed control system of claim 1, wherein the visualization manager is configured to schedule, via the API server, a deployment of the container to the container host.

10. The distributed control system of claim 1, wherein the visualization manager is configured to receive data indicative of one or more factors of the thin client device, and, in response to a permission policy incorporating at least one of the one or more factors, permit access by the thin client device to the visualization generated by the container host.

11. A system, comprising:

a processor; and a memory, accessible by the processor, and storing instructions that, when executed by the processor, cause the processor to run a visualization manager of a container orchestration system, wherein the visualization manager is configured to perform actions comprising:

receiving one or more container images representing one or more containers, wherein the one or more container images are defined based on client input;

identifying a thin client device from a plurality of container hosts of the container orchestration system for executing the one or more containers in response to the thin client device meeting one or more container orchestration constraints, wherein the one or more container orchestration constraints are indicative of an amount of resources available to meet a resource request for running a container; and transmitting the one or more container images representing the one or more containers to the thin client device, wherein the thin client device is configured to display one or more visualizations related to a machine or a process of an industrial automation system in response to executing the one or more containers.

12. The system of claim 11, wherein the actions comprise:

receiving the one or more container images representing the one or more containers, wherein the one or more container images are defined based on the client input;

identifying a first set of one or more thin client devices from the plurality of container hosts of the container orchestration system for executing the one or more containers in response to the first set of one or more thin client devices meeting the one or more container orchestration constraints, wherein the first set of one or more thin client devices is configured to generate the one or more visualizations in response to executing the one or more containers;

receiving the one or more visualizations from the first set of one or more thin client devices; and transmitting the one or more visualizations to a second set of one or more thin client devices from a plurality of devices that are not a part of the container orchestration system, wherein the second set of one or more thin client devices is configured to display the one or more visualizations.

13. The system of claim 11, wherein each of the one or more containers comprises at least one application and respective runtime dependencies.

14. The system of claim 11, wherein the one or more container orchestration constraints are defined or modified based on user input.

15. The system of claim 11, wherein the one or more container orchestration constraints comprise load balancing of the industrial automation system.

16. The system of claim 11, wherein the one or more container images comprise applications that are executable as the one or more containers at runtime of the thin client device.

17. The system of claim 11, wherein the visualization manager is communicatively coupled to each of the plurality of container hosts via an API server associated with the system.

* * * * *